(12) United States Patent
Hemrle et al.

(10) Patent No.: US 8,584,463 B2
(45) Date of Patent: Nov. 19, 2013

(54) THERMOELECTRIC ENERGY STORAGE SYSTEM HAVING TWO THERMAL BATHS AND METHOD FOR STORING THERMOELECTRIC ENERGY

(75) Inventors: Jaroslav Hemrle, Baden-Dättwil (CH); Lilian Kaufmann, Birmenstorf (CH); Mehmet Mercangoez, Stein (CH)

(73) Assignee: ABB Research Ltd., Zürich (CH)

( * ) Notice: Subject to any disclaimer, the term of this patent is extended or adjusted under 35 U.S.C. 154(b) by 105 days.

(21) Appl. No.: 13/273,812

(22) Filed: Oct. 14, 2011

(65) Prior Publication Data

US 2012/0060501 A1 Mar. 15, 2012

Related U.S. Application Data

(63) Continuation of application No. PCT/EP2010/052732, filed on Mar. 4, 2010.

(30) Foreign Application Priority Data

Apr. 14, 2009 (EP) ..................................... 09157835

(51) Int. Cl.
*F01K 1/00* (2006.01)
*F01K 25/02* (2006.01)

(52) U.S. Cl.
USPC .................................. 60/659; 60/676; 60/682

(58) Field of Classification Search
USPC .................................. 60/659, 676, 682–683
See application file for complete search history.

(56) References Cited

U.S. PATENT DOCUMENTS

| 3,996,749 | A | | 12/1976 | Denis et al. |
| 4,089,744 | A | | 5/1978 | Cahn |
| 4,197,719 | A | * | 4/1980 | Shaw ........................... 62/324.1 |
| 4,281,256 | A | * | 7/1981 | Ahrens et al. ................. 290/1 R |
| 4,353,214 | A | * | 10/1982 | Gardner .......................... 60/652 |
| 8,297,056 | B2 | * | 10/2012 | Ashikian ......................... 60/650 |
| 2006/0137349 | A1 | | 6/2006 | Pflanz |
| 2006/0248886 | A1 | * | 11/2006 | Ma ................................. 60/517 |

FOREIGN PATENT DOCUMENTS

EP 1 577 548 A1 9/2005

OTHER PUBLICATIONS

International Search Report (PCT/ISA/210) issued on May 10, 2010, by European Patent Office as the International Searching Authority for International Application No. PCT/EP2010/052732.
European Patent Office (EPO Form 1507N) issued Oct. 29, 2009.
International Preliminary Report on Patentability (PCT/IPEA/409) issued Feb. 1, 2011, by European Patent Office for International Application No. PCT/EP2010/052732.

* cited by examiner

*Primary Examiner* — Hoang Nguyen
(74) *Attorney, Agent, or Firm* — Buchanan Ingersoll & Rooney PC

(57) ABSTRACT

An exemplary system and method for storing and retrieving energy in a thermoelectric energy storage system is disclosed. The thermoelectric energy storage system includes a working fluid that is circulated through a first and second heat exchanger, and a thermal storage medium that is circulated through the first heat exchanger. The second heat exchanger is in connection with a first thermal bath during a charging cycle and with a second thermal bath during a discharging cycle. In this way roundtrip efficiency is improved through minimizing the temperature difference between the first thermal bath and the hot storage tank during charging, and maximizing the temperature difference between the second thermal bath and the hot storage tank during discharging.

19 Claims, 6 Drawing Sheets

THERMOELECTRIC ENERGY STORAGE SYSTEM HAVING TWO THERMAL BATHS AND METHOD FOR STORING THERMOELECTRIC ENERGY

RELATED APPLICATIONS

This application claims priority as a continuation application under 35 U.S.C. §120 to PCT/EP2010/052732, which was filed as an International Application on Mar. 4, 2010 designating the U.S., and which claims priority to European Application 09157835.1 filed in Europe on Apr. 14, 2009. The entire contents of these applications are hereby incorporated by reference in their entireties.

FIELD

The present disclosure relates generally to the storage of electric energy, such as a system and method for storing electric energy in the form of thermal energy in thermal energy storage.

BACKGROUND INFORMATION

Known load generators such as nuclear power plants and generators with stochastic, intermittent energy sources such as wind turbines and solar panels, generate excess electrical power during times of low power demand. Large-scale electrical energy storage systems are a means of diverting this excess energy to times of peak demand and balance the overall electricity generation and consumption.

EP1577548 that describes a thermoelectric energy storage (TEES) system that converts excess electricity to heat in a charging cycle, stores the heat, and converts the heat back to electricity in a discharging cycle, when necessary. Such an energy storage system is robust, compact, site independent and is suited to the storage of electrical energy in large amounts. Thermal energy can be stored in the form of sensible heat via a change in temperature or in the form of latent heat via a change of phase or a combination of both. The storage medium for the sensible heat can be a solid, liquid, or a gas. The storage medium for the latent heat occurs via a change of phase and can involve any of these phases or a combination of them in series or in parallel.

The round-trip efficiency of an electrical energy storage system can be defined as a percentage of electrical energy that can be discharged from the storage in comparison to the electrical energy used to charge the storage, provided that the state of the energy storage system after discharging returns to its initial condition before charging of the storage. Thus, in order to achieve a high roundtrip efficiency, the efficiencies of both modes should be maximized inasmuch as their mutual dependence allows.

All electric energy storage technologies inherently have a limited round-trip efficiency. Thus, for every unit of electrical energy used to charge the storage, only a certain percentage is recovered as electrical energy upon discharge. The rest of the electrical energy is lost. If, for example, the heat stored in a TEES system is provided through resistor heaters, it has approximately 40% round-trip efficiency. The roundtrip efficiency of the TEES system is composed of the charging efficiency and the discharging efficiency.

The roundtrip efficiency of the TEES system is limited for various reasons rooted in the second law of thermodynamics. The first reason relates to the coefficient of performance of the system. When the system is in the charging mode, its ideal efficiency is governed by the coefficient of performance (COP). The COP depends on the temperatures of the cold side ($T_c$) and the hot side ($T_h$) as given by $$COP = \frac{T_h}{T_h - T_c}.$$

Thus, it can be seen that the COP of a heat pump declines with increased difference between input and output temperature levels. Secondly, the conversion of heat to mechanical work in a heat engine is limited by the Carnot efficiency. When the system is in the discharging mode, the efficiency ($\eta$) is given by $$\eta = \frac{T_h - T_c}{T_h}.$$

Thus, it can be seen that efficiency increases when the cold side temperature decreases. Thirdly, any heat flow from a working fluid to a thermal storage and vice versa is dependent on a temperature difference in order to happen. This fact inevitably degrades the temperature level and thus the capability of the heat to do work.

Known industrial processes can involve provision of thermal energy and storage of the thermal energy. Examples are refrigeration devices, heat pumps, air conditioning, and the process industry. In solar thermal power plants, heat is provided, possibly stored, and converted to electrical energy. However, all these applications are distinct from TEES systems because they are not concerned with heat for the exclusive purpose of storing electricity.

The charging cycle of a TEES system can also be referred to as a heat pump cycle and the discharging cycle of a TEES system can be referred to as a heat engine cycle. In the TEES concept, heat should be transferred from a hot working fluid to a thermal storage medium during the charging cycle and back from the thermal storage medium to the working fluid during the discharging cycle. A heat pump should work to move thermal energy from a cold source to a warmer heat sink. Since the amount of energy deposited at the hot side, i.e. the thermal storage medium part of a TEES, is greater than the compression work by an amount equal to the energy taken from the cold side, i.e. the heat absorbed by the working fluid at the low pressure, a heat pump deposits more heat per work input to the hot storage than resistive heating. The ratio of heat output to work input is called coefficient of performance, and it is a value larger than one. In this way, the use of a heat pump can increase the round-trip efficiency of a TEES system.

The charging cycle of a known TEES system includes a work recovering expander, an evaporator, a compressor and a heat exchanger, all connected in series by a working fluid circuit. Further, a cold storage tank and a hot storage tank containing a fluid thermal storage medium are coupled together via the heat exchanger. While the working fluid passes through the evaporator, it absorbs heat from the ambient or from a thermal bath and evaporates. The discharging cycle of a known TEES system includes a pump, a condenser, a turbine and a heat exchanger, all connected in series by a working fluid circuit. Again, a cold storage tank and a hot storage tank containing a fluid thermal storage medium are coupled together via the heat exchanger. While the working fluid passes through the condenser, it exchanges heat energy with the ambient or the thermal bath and condenses. The same thermal bath, such as a river, a lake or a water-ice mixture pool, is used in both the charging and discharging cycles.

There is a need to provide an efficient thermoelectric energy storage having a high round-trip efficiency, while minimising the system costs involved.

SUMMARY

An exemplary thermoelectric energy storage system having a charging cycle for providing thermal energy to a thermal storage, and a discharging cycle for generating electricity by retrieving the thermal energy from the thermal storage is disclosed. The thermoelectric energy storage system including a working fluid circuit for circulating a working fluid through a first heat exchanger and a second heat exchanger; a thermal storage medium circuit for circulating a thermal storage medium, the thermal storage medium circuit having at least one hot storage tank coupled to a cold storage tank via the first heat exchanger, wherein, during a charging cycle, the second heat exchanger is connected to a first thermal bath and a temperature difference between the first thermal bath and a hot storage tank is minimized, and wherein, during a discharging cycle, the second heat exchanger is connected to a second thermal bath and a temperature difference between the second thermal bath and the hot storage tank is maximized.

An exemplary method for storing and retrieving energy in a thermoelectric energy storage system is disclosed. The method comprising charging the system by heating a thermal storage medium, wherein the thermal storage medium circulates between at least one hot storage tank coupled to a cold storage tank; discharging the system by heating a working fluid in a working fluid circuit with heat from the thermal storage medium and expanding the working fluid through a thermodynamic machine; connecting a first thermal bath to the working fluid circuit during charging to minimize a temperature difference between the first thermal bath and a hot storage tank; and connecting a second thermal bath to the working fluid circuit during discharging to maximize a temperature difference between the second thermal bath and the hot storage tank.

An exemplary thermoelectric energy storage system having a charging cycle and a discharging cycle is disclosed. The thermoelectric energy storage system comprising a working fluid circuit for circulating a working fluid through a first heat exchanger and a second heat exchanger; a thermal storage medium circuit having at least one hot storage tank coupled to a cold storage tank via the first heat exchanger, wherein the second heat exchanger is switchably connected to a first thermal bath during the charging cycle and to a second thermal bath during the discharging cycle.

DESCRIPTION OF THE DRAWINGS

The subject matter of the disclosure will be explained in more detail in the following text with reference to preferred exemplary embodiments, which are illustrated in the attached drawings, in which.

For consistency, the same reference numerals are used to denote similar elements illustrated throughout the figures.

DETAILED DESCRIPTION

Figure 1:
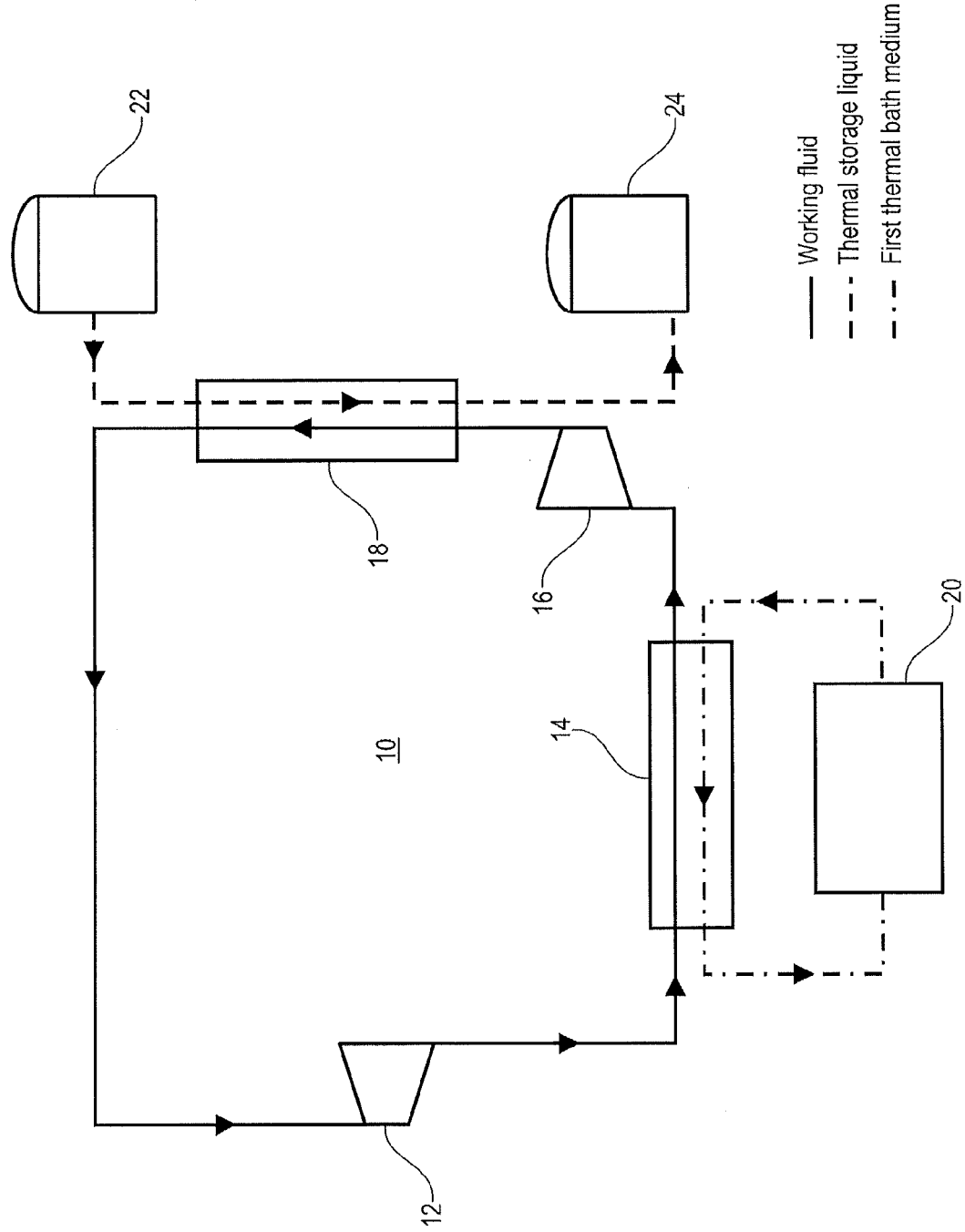
FIG. 1 shows a simplified schematic diagram of a charging cycle of a thermoelectric energy storage system in accordance with an exemplary embodiment of the present disclosure.

Exemplary embodiments of the present disclosure provide a thermoelectric energy storage system for converting electrical energy into thermal energy to be stored and converted back to electrical energy with an improved round-trip efficiency.

An exemplary thermoelectric energy storage system of the present disclosure includes a charging cycle for providing thermal energy to a thermal storage, and a discharging cycle for generating electricity by retrieving the thermal energy from the thermal storage. The thermoelectric energy storage system includes a working fluid circuit for circulating a working fluid through a first heat exchanger and a second heat exchanger, and a thermal storage medium circuit for circulating a thermal storage medium. The thermal storage medium circuit has at least one hot storage tank coupled to a cold storage tank via the first heat exchanger. During a charging cycle, the second heat exchanger is in connection with a first thermal bath, and the temperature difference between the first thermal bath and a hot storage tank is minimized. During a discharging cycle, the second heat exchanger is in connection with a second thermal bath, and the temperature difference between the second thermal bath and the hot storage tank is maximized.

In other words, the temperatures of the thermal baths are chosen such that the first thermal bath is at a relatively higher temperature than the second thermal bath.

The thermal storage medium can be a liquid, such as water, for example. The working fluid of exemplary embodiments of the present disclosure can be carbon dioxide.

In an exemplary embodiment, a cooling device is in connection with the cold storage tank during or after a charging cycle. Advantageously, this arrangement functions to lower the temperature of the thermal storage medium in the cold storage tank, hence adjusting the temperature of the cold storage tank to the specified temperature of the discharging cycle.

In another exemplary embodiment, a heating device is in connection with the cold storage tank during or after a discharging cycle. Advantageously, this arrangement functions to raise the temperature of the thermal storage medium in the cold storage tank, hence adjusting the temperature of the cold storage tank to the specified temperature of the charging cycle.

In another exemplary embodiment of the present disclosure, at least one section of a charging cycle or a discharging cycle runs transcritically.

In an exemplary embodiment of the present disclosure a method is provided for storing and retrieving energy in a thermoelectric energy storage system. The method includes charging the system by heating a thermal storage medium, wherein the thermal storage medium circulates between at least one hot storage tank coupled to a cold storage tank and discharging the system by heating a working fluid in a working fluid circuit with heat from the thermal storage medium and expanding the working fluid through a thermodynamic machine. The method further includes connecting a first thermal bath to the working fluid circuit during charging to enable the temperature difference between the first thermal bath and a hot storage tank to be minimized, and subsequently connecting a second thermal bath to the working fluid circuit during discharging to enable the temperature difference between the second thermal bath and the hot storage tank to be maximized. Again, the temperatures of the thermal baths are chosen such that the first thermal bath is at a relatively higher temperature than the second thermal bath.

Advantageously, the minimization of the temperature difference between the first thermal bath and a hot storage tank, during charging, results in a lower electricity input specification. Furthermore, the maximization of the temperature difference between the second thermal bath and a hot storage tank, during discharging, results in a higher energy recovery.

In another exemplary embodiment of the present disclosure, the method can include connecting a cooling device to the cold storage tank during or after a charging cycle.

In a exemplary embodiment of the present disclosure, the method further comprises connecting a heating device to the cold storage tank during or after a discharging cycle.

In an exemplary embodiment of the present disclosure, at least one section of a charging cycle or a discharging cycle is performed transcritically.

Thus, it should be understood that exemplary embodiments of the present disclosure provide an efficient thermoelectric energy storage having a relatively high round-trip efficiency, while minimising the system costs involved.

Figure 2:
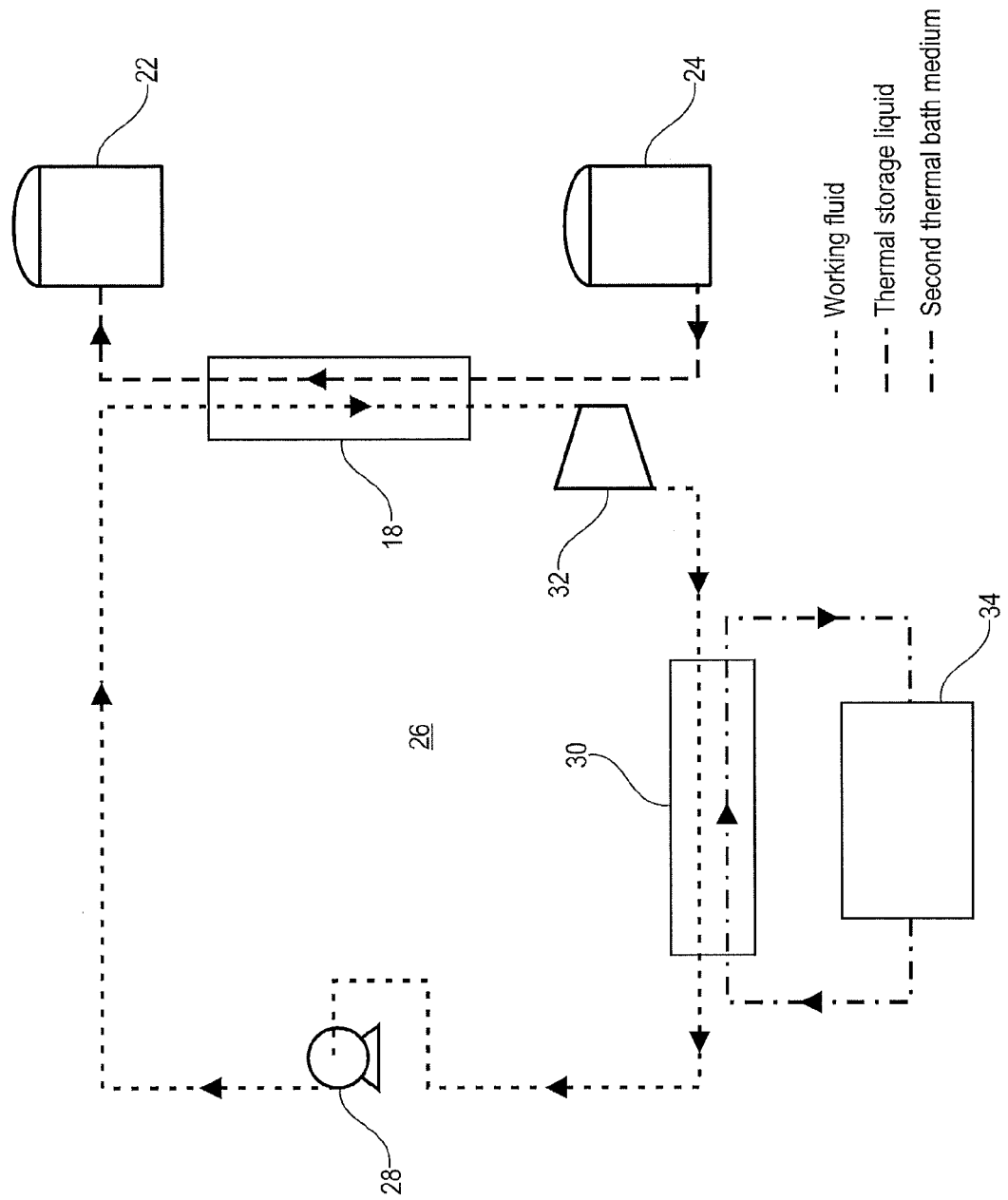
FIG. 2 shows a simplified schematic diagram of a discharging cycle of a thermoelectric energy storage system in accordance with an exemplary embodiment of the present disclosure.

FIGS. 1 and 2 schematically depict a charging cycle system and a discharging cycle system, respectively, of a TEES system in accordance with exemplary embodiments of the present disclosure.

The charging cycle system 10 shown in FIG. 1 includes a work recovering expander 12, an evaporator 14, a compressor 16 and a heat exchanger 18, wherein the evaporator 14 is in connection with a first thermal bath 20. A working fluid circulates through the components as indicated by the solid line with arrows in FIG. 1. Further, a cold storage tank 22 and a hot storage tank 24 containing a fluid thermal storage medium are coupled together via the heat exchanger 18. The thermal storage liquid flows between the cold storage tank 22 and the hot storage tank 24 as indicated by the dashed line with arrows. Further, a first thermal bath medium cycles between the first thermal bath 20 and the evaporator 14 as indicated by the dot-dash line with arrows.

In operation, the charging cycle system 10 performs a thermodynamic cycle and the working fluid flows around the TEES system in the following manner. The working fluid in the evaporator 14 absorbs heat from the first thermal bath medium, and evaporates. The temperature of the first thermal bath 20 can be higher than the ambient temperature, for example from 25° C. to 400° C. The vaporized working fluid is circulated to the compressor 16 and surplus electrical energy is utilized to compress and heat the working fluid. The working fluid is fed through the heat exchanger 18 where the working fluid discards heat into the thermal storage medium.

The compressed working fluid exits the heat exchanger 18 and enters the expander 12. Here the working fluid is expanded to a lower pressure which corresponds to the evaporator inlet pressure. The working fluid flows from the expander 12 back into the evaporator 14.

The fluid thermal storage medium is pumped from the cold storage tank 22 through the heat exchanger 18 to the hot storage tank 24. The heat energy discarded from the working fluid into the thermal storage medium is stored in the form of sensible heat.

The discharging cycle system 26 shown in FIG. 2 includes a pump 28, a condenser 30, a turbine 32 and a heat exchanger 18, wherein the condenser 30 is in contact with a second thermal bath 34. A working fluid circulates through these components as indicated by the dotted line with arrows in FIG. 2. Further, a cold storage tank 22 and a hot storage tank 24 containing a fluid thermal storage medium are coupled together via the heat exchanger 18. The thermal storage medium (represented by the dashed line) is pumped from the hot storage tank 24 through the heat exchanger to the cold storage tank 22. A second thermal bath medium cycles between the second thermal bath 34 and the condenser 30 (indicated by the dot-dash line with arrows).

In operation, the discharging cycle system 26 performs a thermodynamic cycle and the working fluid flows around the TEES system in the following manner. Heat energy is transferred from the thermal storage medium to the working fluid causing heating of the working fluid. The working fluid exits the heat exchanger 18 and enters the turbine 32 where the working fluid is expanded thereby causing the turbine 32 coupled to a generator (not illustrated) to generate electrical energy. Next, the working fluid enters the condenser 30, where the working fluid is condensed by exchanging heat energy with the second thermal bath medium. The temperature of the second thermal bath 34 can be at the ambient and therefore lower than the temperature of the first heat bath, for example from 0° C. to 15° C. The condensed working fluid exits the condenser 30 via an outlet and is pumped again into the heat exchanger 18 via the pump 28.

While the charging cycle system of FIG. 1 and the discharging cycle system of FIG. 2 have been illustrated separately, the heat exchanger 18, cold storage tank 22, hot storage tank 24 and thermal storage medium can be common to both. The charging and discharging cycles may be performed consecutively, not simultaneously.

In an exemplary embodiment of the present disclosure, the heat exchanger can be a counterflow heat exchanger, and the working fluid of the cycle can be carbon dioxide. Further, the thermal storage medium can be a liquid, such as water, for example, and the compressor can be an electrically powered compressor.

Figure 5:
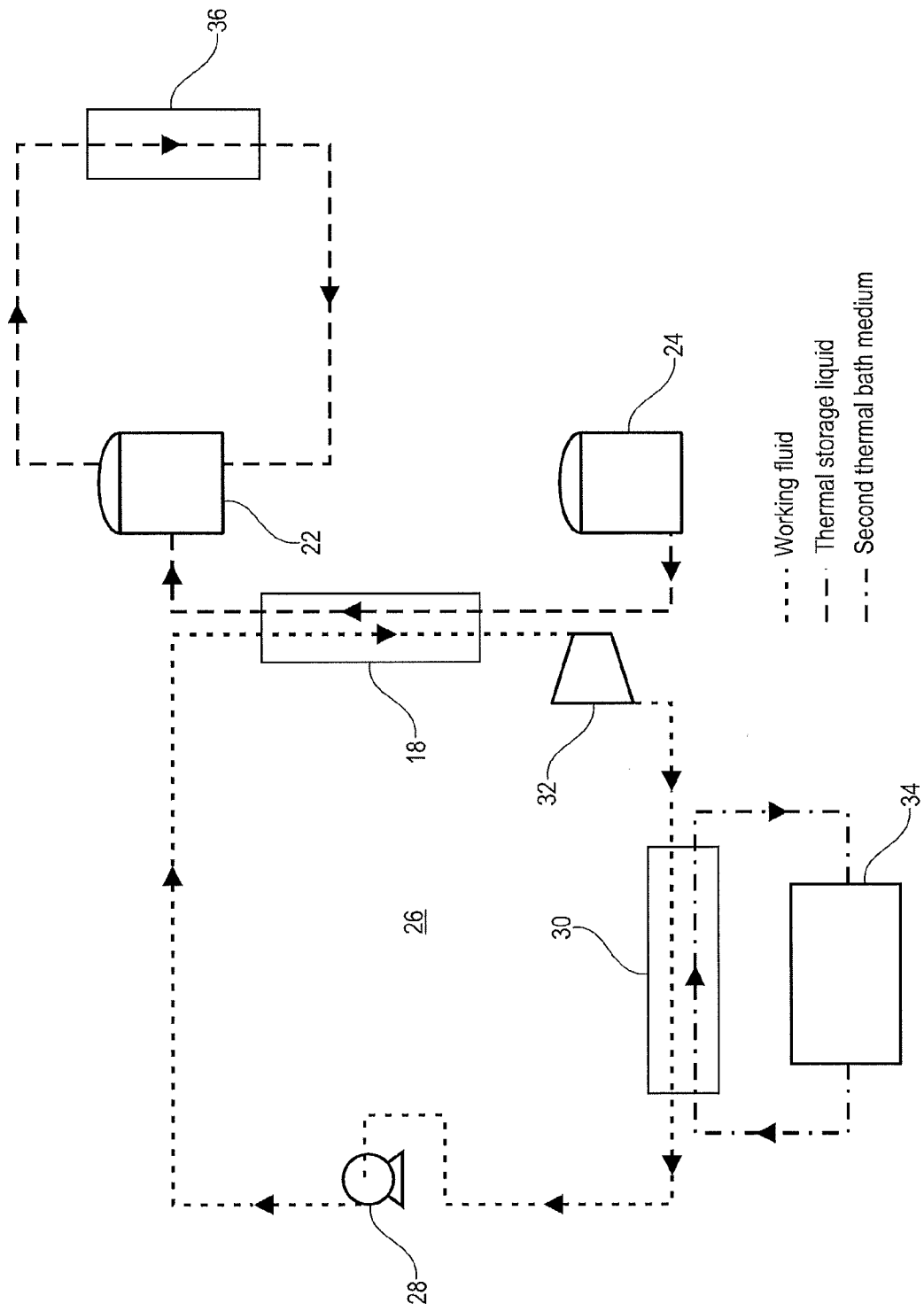
FIG. 5 shows a simplified schematic diagram of a further embodiment of the thermoelectric energy storage system of an exemplary embodiment of the present disclosure.

As discussed above, the coefficient of performance (COP) of a TEES system increases if the temperature difference between cold side and the hot side decreases. Thus, during charging, it can be advantageous to decrease the temperature level of the hot side or raise the temperature level of the cold side. In an exemplary embodiment of the present disclosure as shown in FIG. 1, the first thermal bath 20 acts to raise the temperature of the cold side of the cycle. In another exemplary embodiment of the present disclosure, an additional cooling device can act to lower the temperature of the cold storage tank 22 during or after charging. Such a system is illustrated in FIG. 5 for the discharging cycle. It should be understood that an equivalent circuit for the charging cycle can have an additional cooling device is coupled to the cold storage tank 22.

As discussed above, the efficiency of a TEES system increases during discharging if the temperature difference between the cold side and the hot side increases. Thus, it is advantageous to increase the temperature level of the hot side or lower the temperature level of the cold side. In an embodiment of the present disclosure as shown in FIG. 2, the second thermal bath 34 can act to lower the temperature of the cold side of the cycle. In an alternative embodiment of the present disclosure as shown in FIG. 5, an additional heating device 36 can act to raise the temperature of the cold storage tank 22 during or after the discharging cycle. The additional heating device 36 can be coupled to the cold storage tank 22. In exemplary embodiments of the present disclosure, the temperature of the hot storage tank 24 is the same during the charging cycle and the discharging cycle.

Thus, providing two separate thermal baths 20, 34, one for use during the charging cycle 10 and a second for use during the discharging cycle 26 can be highly advantageous. For example, a lower electricity input can be specified in the charging cycle, and more energy is recovered in the discharging cycle, thereby increasing overall roundtrip efficiency and cost effectiveness.

The temperature of the cold storage tank 22 and the hot storage tank 24 should be in a similar range during both the charging and discharging cycles. It should be understood that in an exemplary TEES system having a single thermal bath at the ambient temperature in contact with both the evaporator and condenser, the temperatures of the cold storage tank 22 and the hot storage tank 24 of the charging and of the discharging cycle will match, respectively. However, in the TEES system of the present disclosure, the charging and discharging cycles can specify respective exemplary embodiments on account of the different temperature levels of the first thermal bath 20 and the second thermal bath 34. Respective examples of these embodiments can be described as follows;

i) an exemplary embodiment of the present disclosure in which
  the cold storage tank has the same temperature during charging and discharging,
  the hot storage tank has the same temperature during charging and discharging,
  the working fluid pressure during heat exchange with the thermal storage medium is the same during charging and discharging.
ii) an exemplary embodiment of the present disclosure in which
  the cold storage tank has a different temperature during charging and discharging,
  the hot storage tank has the same temperature during charging and discharging,
  the working fluid pressure during heat exchange with the thermal storage medium is different during charging and discharging.

Figure 3:
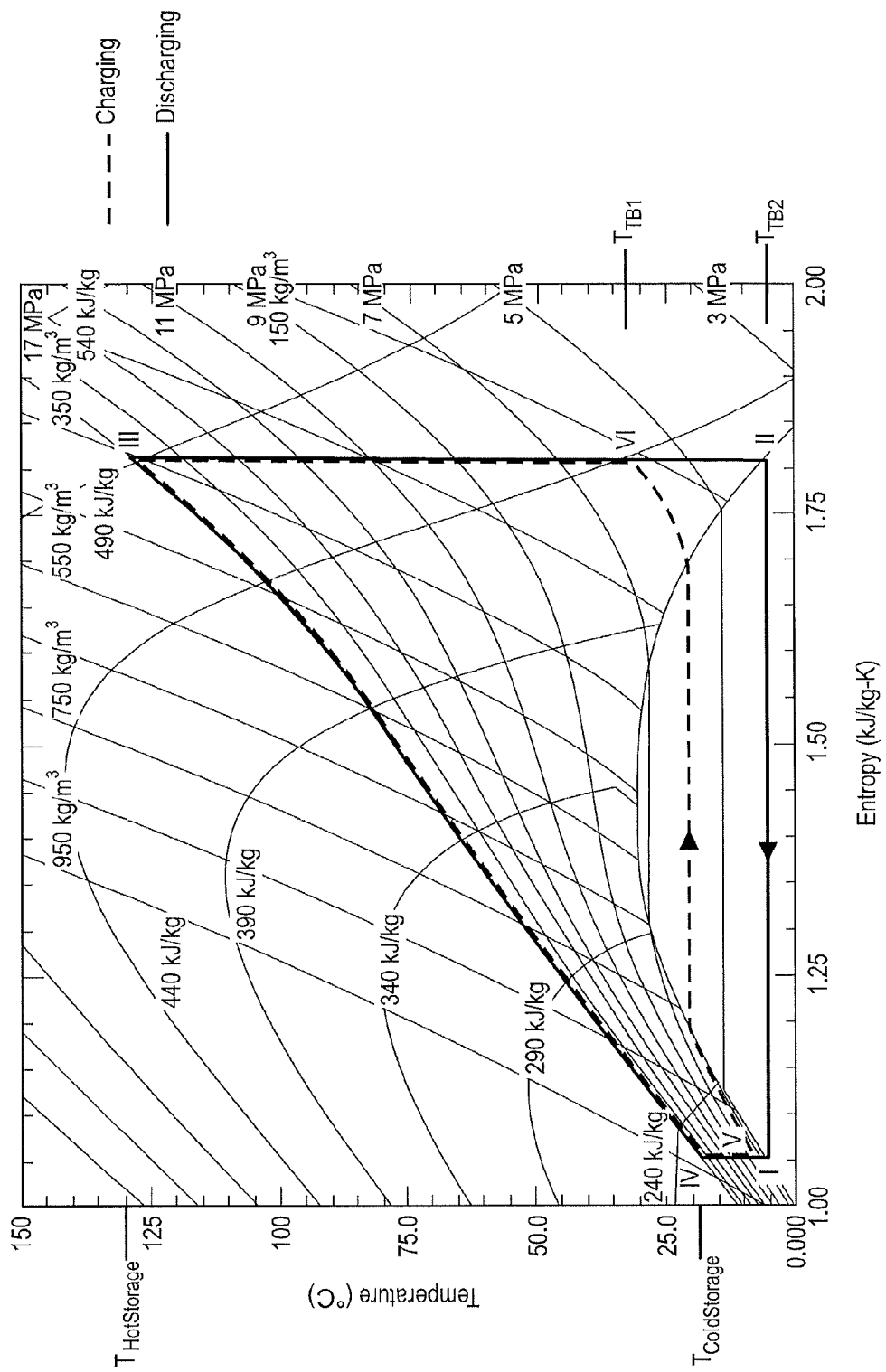
FIG. 3 shows an entropy-temperature diagram of the heat transfer from the cycles in a TEES system of an exemplary embodiment of the present disclosure utilizing a relatively low temperature thermal bath.

FIG. 3 shows an entropy-temperature diagram of the heat transfer from the cycles in a TEES system of an exemplary embodiment of the present disclosure utilizing a relatively low temperature thermal bath. In a TEES system in which the cold storage tank 22 has equal temperature during charging and discharging and the hot storage tank 24 has equal temperature during charging and discharging, the suitable thermodynamic cycle for the system is determined by the temperature of the first thermal bath 20. FIG. 3 shows a suitable thermodynamic cycle when the temperature of the first thermal bath is relatively low, i.e. of the order of 30° C. to 50° C.

In the entropy-temperature diagram of FIG. 3, the charging cycle is shown as a dashed line and follows a counter-clockwise direction, whereas the discharging cycle is shown as a solid line and follows a clockwise direction. In this exemplary embodiment both cycles run transcritically and the working fluid is assumed to be carbon dioxide. The charging cycle comprises (consists of a) preheating, evaporation and superheating of the working fluid between points V-VI, after which temperature $T_{TB1}$ is approximately reached by the working fluid, except for the minimal approach temperature (i.e., the minimal temperature difference between the two fluids exchanging heat) which is used to drive the heat transfer. Heat exchange with the first thermal bath at $T_{TB1}$ occurs partially in a subcritical range between points V and VI as shown in FIG. 3. The heat exchange at the cold side is followed by compression between points VI-III during which the work is delivered to the working fluid by an electrically driven compressor. Between points heat is transferred from the working fluid to the fluid storage medium in a countercurrent heat exchanger. The cycle is closed by expansion of the working fluid between points IV-V. The expansion needs to terminate at the isobars corresponding to the pressure at which the fluid is evaporated during heat exchange V-VI.

The discharging cycle follows the solid line in the sequence Section I-IV corresponds to pumping of the working fluid to the high pressure, with the compression work higher than the expansion during charging. The heat exchange in the supercritical region, represented at section IV-III, takes place at constant pressure of the working fluid and between the temperatures of the cold and hot storage tanks. The expansion between points III and II results in more work produced than the work used previously in the compression stage (between points VI and III) during charging. The condensation of the working fluid, between points II and I, occurs via heat exchange with the second thermal bath medium at temperature, $T_{TB2}$.

The thermodynamic cycle in FIG. 3 is designed in such a way that the maximum temperature and pressure attained by the working fluid are the same for both the charging cycle and the discharging cycle.

Figure 4:
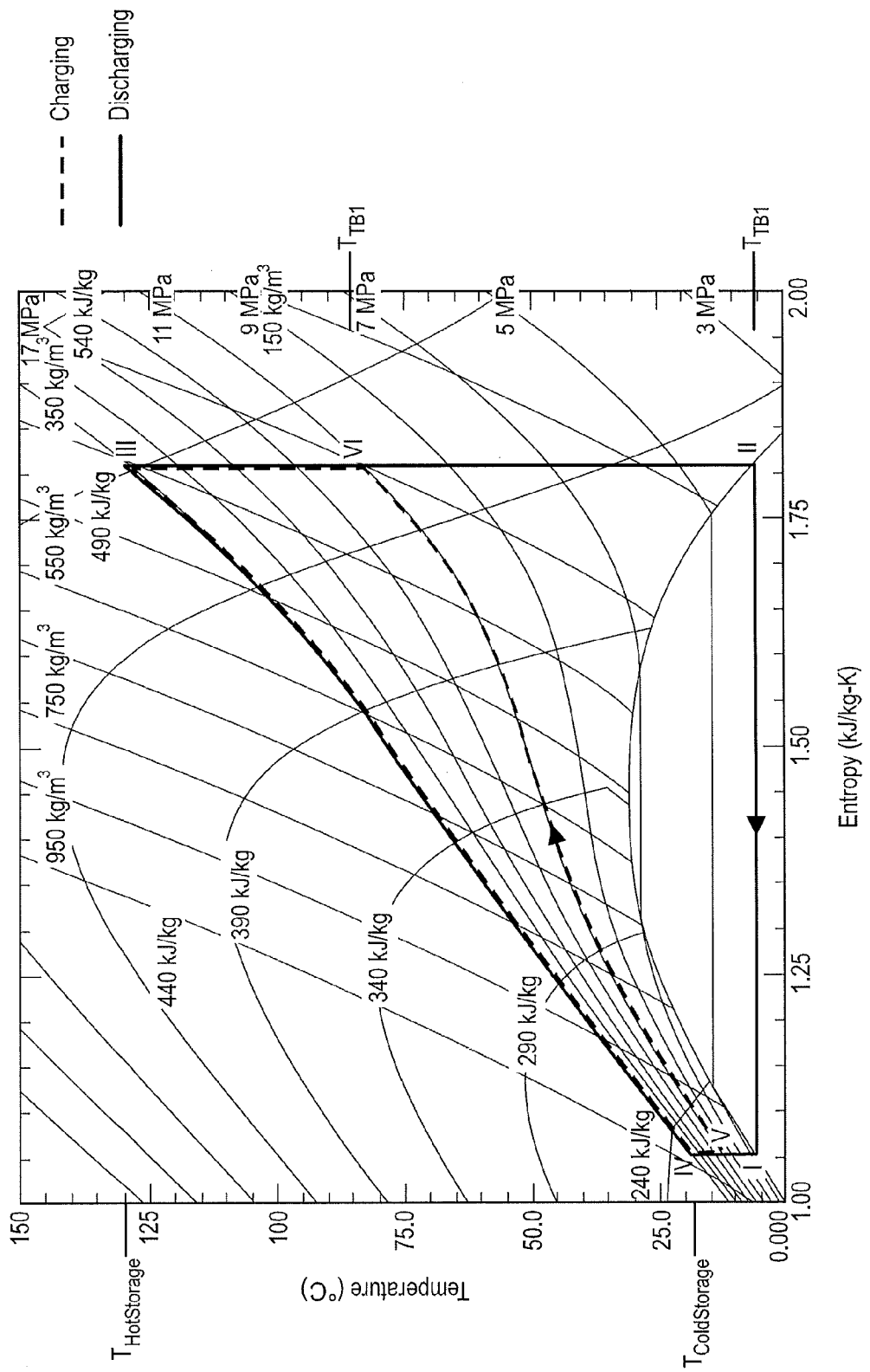
FIG. 4 shows an entropy-temperature diagram of the heat transfer from the cycles in a TEES system of an exemplary embodiment of the present disclosure utilizing a relatively high temperature thermal bath.

FIG. 4 shows an entropy-temperature diagram of the heat transfer from the cycles in a TEES system of an exemplary embodiment of the present disclosure utilizing a relatively high temperature thermal bath. Again, consider a TEES system in which the cold storage tank 22 has equal temperature during charging and discharging and the hot storage tank 24 has equal temperature during charging and discharging. FIG. 4 shows a suitable thermodynamic cycle when the temperature of the first thermal bath, $T_{TB1}$, is relatively high, i.e. of the order of 75° C. to 100° C.

Similarly, the charging cycle is shown as a dashed line and the discharging cycle is shown as a solid line in the entropy-temperature diagram. In this exemplary embodiment, the charging cycle runs entirely supercritically and the discharging cycle runs transcritically. In FIG. 4, heat exchange with the first thermal bath at $T_{TB1}$ occurs in a supercritical range between points V and VI. The pressure ratio of the working fluid can be less in the charging cycle shown in FIG. 4 than that of FIG. 3. This pressure ratio is advantageous because a relatively lower work input is used by the compressor 16, and thus the specified electrical input energy is also proportionately lower.

The discharging cycle of FIG. 4 is comparable to that shown in FIG. 3.

The exemplary thermodynamic cycle of FIG. 4 is designed such that the maximum temperature and pressure attained by the working fluid are the same for both the charging cycle and the discharging cycle.

Figure 6:
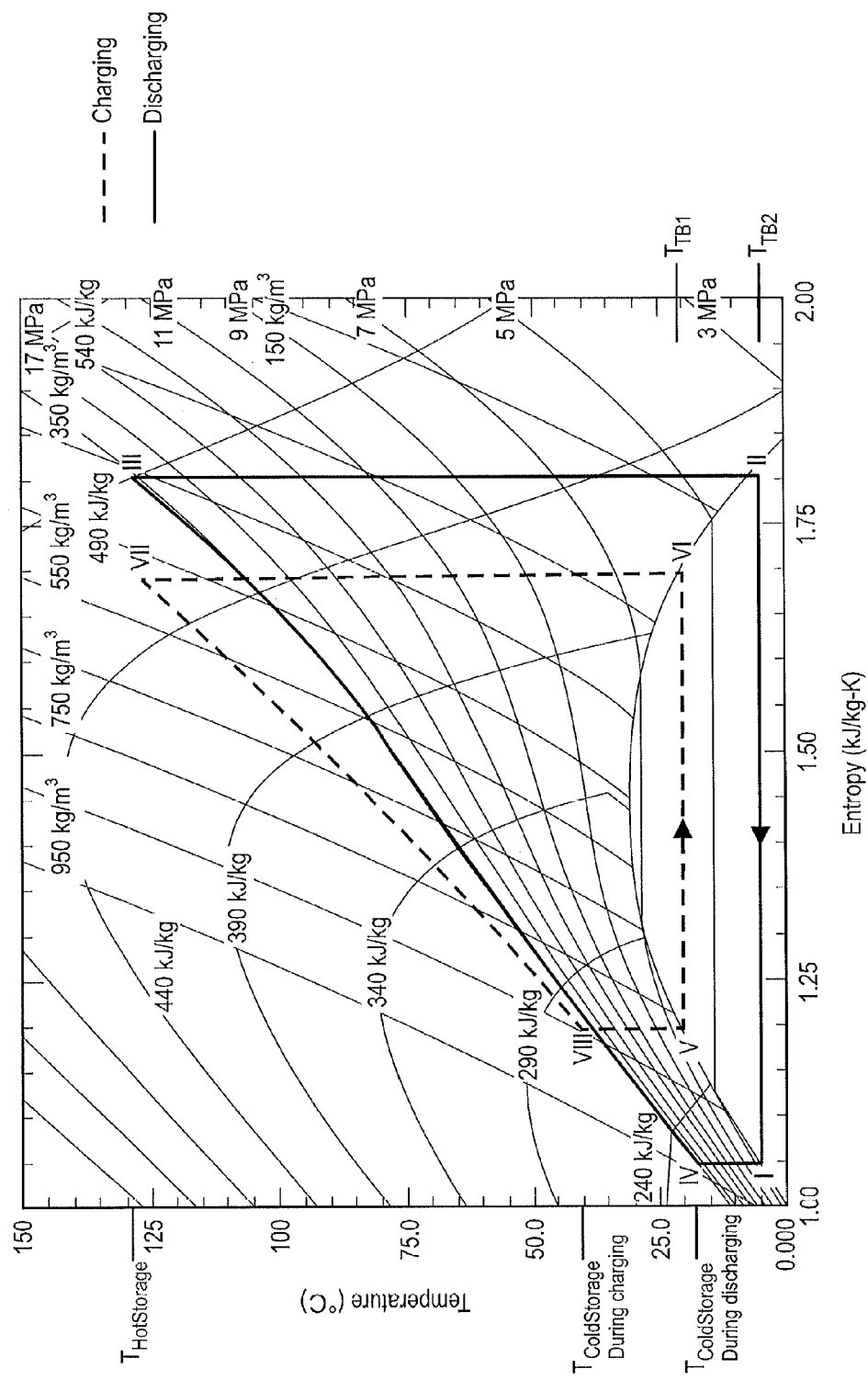
FIG. 6 shows an entropy-temperature diagram of the heat transfer from the cycles in the TEES system of FIG. 5 of an exemplary embodiment of the present disclosure.

In an exemplary TEES system in which the working fluid operates at different pressures during charging and discharging, and the cold storage tank 22 can have a different temperature during charging and discharging, then the maximum temperature of the hot storage tank 24 should be the same in both the charging and discharging cycles. FIG. 5 shows a simplified schematic diagram of a further embodiment of the thermoelectric energy storage system of an exemplary embodiment of the present disclosure. FIG. 6 shows an entropy-temperature diagram of the heat transfer from the cycles in the TEES system of FIG. 5 of an exemplary embodiment of the present disclosure. FIGS. 5 and 6 show an exemplary embodiment of the TEES system in which the working fluid pressure is higher during the charging cycle than during the discharging cycle and the temperature of the cold storage tank, $T_{ColdStorage}$, is different during the charging cycle and the discharging cycle. As discussed above, while FIG. 5 shows a discharging cycle, it should be understood that a charging cycle equivalent to that of FIG. 1 can be implemented. As illustrated in FIGS. 5 and 6, the minimum temperature of the storage medium during charging is higher than the temperature of the cold storage needed for discharging. In order to adjust $T_{ColdStorage}$ when changing between the charging cycle and the discharging cycle, an additional coupling of the cold storage tank to a heating or cooling device is utilized. For example, the thermal storage medium in the cold storage tank can be pumped through a cooler or through a heater, as specified. Alternatively, the heating can be achieved via a coupling of the cold storage tank 22 to the first or second thermal bath at temperature $T_{TB1}$, also in a separate loop.

FIG. 6 shows an entropy-temperature diagram for the TEES system of FIG. 5. The charging cycle is shown as a dashed line and follows a counter-clockwise direction, whereas the discharging cycle is shown as a solid line and follows a clockwise direction. In this exemplary embodiment both cycles run transcritically.

In the charging cycle between points V-VI, evaporation of the working fluid at temperature $T_{TB1}$ occurs. The compression between points VI-VII delivers the mechanical work to the working fluid. Between points VII-VIII, heat is transferred from the working fluid to the fluid storage medium. The expansion from point VIII to V recovers part of the compression work, closing the cycle.

As an additional step between charging and discharging, the temperature of the fluid storage medium remaining in the cold storage tank 22 is lowered to reach the cold storage temperature during discharging. An exemplary method to achieve this result can include (e.g., consists of) coupling it to the second thermal bath 34.

In the discharging cycle, section I-IV corresponds to compression of the working fluid. The heat exchange in the supercritical region, represented at section IV-III, takes place at constant pressure of the working fluid and between the temperatures of the cold and hot storage tanks. The condensation of the working fluid, between points II and I, occurs via heat exchange with the second thermal bath medium at temperature, $T_{TB2}$.

Before charging, the temperature of the thermal storage medium in the cold storage tank 22 should be upgraded to the temperature needed for charging, which can be achieved for example by heating from an additional low grade waste heat source or electrically possibly in conjunction with a secondary heat pump.

In an exemplary embodiment of the present disclosure, an additional hot storage tank can be installed in connection to the original hot storage tank. The additional hot storage tank is charged in parallel with the original hot storage tank and used after the discharging cycle to increase the temperature of the cold storage tank to the specified level. This option is especially advantageous if the first thermal bath is not permanently available.

In a further exemplary embodiment, where a relatively hot source, i.e., the first thermal bath, is available, and has a temperature in excess of that of the hot storage tank (for example, of the order of 150° C. to 400° C.), then the hot source can be used to directly heat the hot storage tank in the charging mode. As a result, the charging cycle can be replaced by a system having only a single heat exchanger, which transfers the source heat to the TEES hot storage tank. Consequently, no electrical work input is needed, and the charging cycle is therefore independent of electricity availability and cost.

In a yet further exemplary embodiment of the present disclosure, the first thermal bath can be at ambient temperature and the second thermal bath can be a body of water, such as a lake, having a lower temperature than the ambient. Thus, ensuring the cold side of the system is cooler during the discharging cycle as specified.

In an exemplary TEES system of the present disclosure, a further embodiment is envisaged wherein the cold storage tank has different temperatures during charging and discharging, the hot storage tank has the same temperature during charging and discharging, and the working fluid pressure during heat exchange with the thermal storage medium is the same during charging and discharging. Consequently, the charging and discharging cycles specify adaptation on account of the different temperatures of the cold storage tank.

Another exemplary embodiment can use one single heat bath, the temperature of which is varied between the two heat bath temperature levels, such as solar pond. Such a pond can be heated during day, to temperature $T_{TB1}$, to supply heat corresponding to the first heat bath for charging. When depleted and cooled, to temperature $T_{TB2}$, it can provide the second heat bath at lower temperature for discharging. In this case, one single heat bath can act as the above described two different temperature level baths by temporal variation.

It is possible that some types of thermal baths can be subject to temperature variations over the course of a day. In such cases, it is possible that the second thermal bath may not provide a high enough temperature for the TEES discharging cycle. In this case, an additional tank can be filled with hot thermal storage medium during the charging cycle, which will later on be used during the discharging cycle to bring the cold storage tank to the specified temperature level.

It should be understood that two different types of heat exchangers on the cold side of the TEES system can be employed for the charging cycle and for the discharging cycle. This is technically advantageous if the first and second thermal baths are different in terms of material and/or temperature. Furthermore, where the first and second thermal baths are significantly different in terms of material and/or temperature, then different working fluids can be used for the charging cycle and the discharging cycle. The two cycles can then be completely separate except for the coupling to the hot and cold storage tanks. Examples of working fluids that can be used are any refrigerants with a critical temperature between the low and high temperature levels of the discharging cycle.

It is also envisaged that the same heat exchanger can be employed on the cold side of the TEES system for the charging cycle and discharging cycle if the temperature of the thermal bath itself can be varied, as in the case of a solar pond.

Advantageously, the additional thermal bath for the charging mode could be provided by another heat source present at the location of the TEES storage. Various forms of such additional thermal baths are possible, depending on the location of the TEES installation. Examples for suitable moderate temperature heat sources are waste heat from power plant steam turbine cycles, solar ponds which are heated up by the sun before used by the system, or geothermal ground heat. Waste heat from industrial processes is also a viable candidate, providing large available temperature ranges (from 60° C. to 400° C.). All of these heat sources can have a higher temperature than the environment. Their temperature level is often not high enough to be suitable for waste heat recovery or other applications like house heating, but is enough to be advantageous for usage in the TEES cycle of the present disclosure.

Advantageously, relatively low grade heat can be utilized to enhance round-trip efficiency of a TEES system. For example, in exemplary embodiments of the present disclosure, relatively low grade heat can be upgraded to stored heat during a period of low cost electricity, and that stored heat can be used later at the time of high electricity demand to increase the temperature of the first thermal bath during charging or the cold storage tank during discharging. Further, when waste heat is available, but not during a period of low cost electricity, the heat can be kept for example in an additional warm water pool until a period of low cost electricity, at which time the waste heat can be upgraded to high grade heat and stored.

It should be understood that the thermodynamic cycles of exemplary embodiments of the present disclosure can provide increased roundtrip efficiency already for the case when all stages of the cycles are performed in the subcritical region. In the context of the present disclosure, greater advantage can be obtained when one or more sections of the thermodynamic cycles are performed transcritically.

While the thermal storage medium is generally water (if necessary, in a pressurized container), other materials, such as oil or molten salt, can also be used.

It should be understood that the condenser and the evaporator in the TEES system can be replaced with a multi-purpose heat exchange device that can assume both roles, since the use of the evaporator in the charging cycle and the use of the condenser in the discharging cycle will be carried out in different periods. Similarly the turbine and the compressor roles can be carried out by the same machinery, referred to herein as a thermodynamic machine, capable of achieving both tasks.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A thermoelectric energy storage system having a charging cycle for providing thermal energy to a thermal storage, and a discharging cycle for generating electricity by retrieving the thermal energy from the thermal storage, the thermoelectric energy storage system comprising:
    a working fluid circuit for circulating a working fluid through a first heat exchanger and a second heat exchanger;
    a thermal storage medium circuit for circulating a thermal storage medium, the thermal storage medium circuit having at least one hot storage tank coupled to a cold storage tank via the first heat exchanger;
    wherein, during a charging cycle, the second heat exchanger is connected to a first thermal bath and a temperature difference between the first thermal bath and a hot storage tank is minimized, and
    wherein, during a discharging cycle, the second heat exchanger is connected to a second thermal bath and a temperature difference between the second thermal bath and the hot storage tank is maximized.

2. The thermoelectric energy storage system according to claim 1, wherein the system is configured to cycle a first thermal bath medium between the first thermal bath and the second heat exchanger during the charging cycle; and to cycle a second thermal bath medium between the second thermal bath and the second heat exchanger during the discharging cycle.

3. The thermoelectric energy storage system according to claim 1, comprising:
    two separate second heat exchangers, one being an evaporator and the other being a condenser.

4. The thermoelectric energy storage system according to claim 1, comprising:
    an additional cooling device in connection with the cold storage tank during or after the charging cycle.

5. The thermoelectric energy storage system according to claim 1, comprising:
    an additional heating device in connection with the cold storage tank during or after the discharging cycle.

6. The thermoelectric energy storage system according to claim 1, wherein at least one section of the charging cycle or the discharging cycle runs transcritically.

7. The thermoelectric energy storage system according to claim 2, wherein at least one section of the charging cycle or the discharging cycle runs transcritically.

8. The thermoelectric energy storage system according to claim 2, comprising:
    two separate second heat exchangers, one being an evaporator and the other being a condenser.

9. The thermoelectric energy storage system according to claim 7, comprising:
    two separate second heat exchangers, one being an evaporator and the other being a condenser.

10. A method for storing and retrieving energy in a thermoelectric energy storage system, comprising:
    a.) charging the system by heating a thermal storage medium, wherein the thermal storage medium circulates between at least one hot storage tank coupled to a cold storage tank via a first heat exchanger, wherein heat from a working fluid is discarded into the thermal storage medium in the first heat exchanger;
    b.) discharging the system by heating a working fluid in a working fluid circuit by transferring heat from the thermal storage medium to the working fluid in the first heat exchanger and expanding the working fluid through a thermodynamic machine;
    c.) connecting a first thermal bath to the working fluid circuit during charging to minimize the temperature difference between the first thermal bath and the hot storage tank; and
    d.) connecting a second thermal bath to the working fluid circuit during discharging to maximize the temperature difference between the second thermal bath and the hot storage tank.

11. The method according to claim 10, wherein
    in c.), a first thermal bath medium is cycled between the first thermal bath and an evaporator provided in the working fluid circuit for evaporating working fluid through absorption of heat from the first thermal bath medium; and
    in d.), a second thermal bath medium is cycled between the second thermal bath and a condenser provided in the working fluid circuit for condensing working fluid by exchange of heat with the second thermal bath medium.

12. The method according to claim 10, comprising:
    lowering a temperature of the cold storage tank during charging.

13. The method according to claim 10, comprising:
lowering a temperature of the cold storage tank after charging by connecting an additional cooling device.

14. The method according to claim 10, comprising:
raising a temperature of the cold storage tank during discharging.

15. The method according to claim 10, comprising:
raising a temperature of the cold storage tank after discharging by connecting an additional cooling device.

16. The method according to claim 12, comprising:
raising a temperature of the cold storage tank during or after discharging.

17. The method according to claim 13, comprising:
raising a temperature of the cold storage tank during or after discharging.

18. The method according to claim 10, wherein at least one section of a charging cycle or a discharging cycle is performed transcritically.

19. The method according to claim 11, wherein at least one section of a charging cycle or a discharging cycle is performed transcritically.

* * * * *